United States Patent
Simpson

(10) Patent No.: US 11,179,987 B1
(45) Date of Patent: Nov. 23, 2021

(54) AIRBOAT RUDDER

(71) Applicant: David W. Simpson, Vero Beach, FL (US)

(72) Inventor: David W. Simpson, Vero Beach, FL (US)

( * ) Notice: Subject to any disclaimer, the term of this patent is extended or adjusted under 35 U.S.C. 154(b) by 0 days.

(21) Appl. No.: 16/927,348

(22) Filed: Jul. 13, 2020

Related U.S. Application Data

(60) Provisional application No. 62/873,657, filed on Jul. 12, 2019.

(51) Int. Cl.
| | |
|---|---|
| B63B 3/00 | (2006.01) |
| B63H 7/02 | (2006.01) |
| B63H 25/38 | (2006.01) |
| B60F 3/00 | (2006.01) |

(52) U.S. Cl.
CPC ............ B60F 3/0007 (2013.01); B60F 3/003 (2013.01)

(58) Field of Classification Search
CPC .......... B60F 3/00; B60F 3/003; B60F 3/0007; B63H 25/38; B63H 7/00; B63H 7/01
See application file for complete search history.

(56) References Cited

U.S. PATENT DOCUMENTS

| | | | | | |
|---|---|---|---|---|---|
| 2,099,229 | A | * | 11/1937 | Possenheim | B63H 1/28 114/162 |
| 2,686,490 | A | * | 8/1954 | Bencal | B63H 25/38 114/166 |
| 4,421,489 | A | * | 12/1983 | Van Veldhuizen | B60V 1/14 114/150 |
| 2012/0174849 | A1 | * | 7/2012 | Van Oossanen | B63H 25/38 114/163 |

* cited by examiner

*Primary Examiner* — Stephen P Avila
(74) *Attorney, Agent, or Firm* — Akerman LLP; Michael K. Dixon

(57) ABSTRACT

An airboat rudder that results in increased turning force on the airboat while also being easily controlled by the airboat driver is disclosed. Airboats can be configured to run on both water and dry ground. Many times, somewhat dry mud and some types of grass are very difficult to run over and will cause an airboat to get stuck. One way of getting an airboat free is to oscillate the one or more airboat rudders from a hard right hand turn to a hard left hand turn. Doing so creates lateral forces on the airboat from both directions at different times causing the back of the airboat to move to the side and slightly forward as well. The airboat rudder disclosed herein increases the amount of lateral force generated on the airboat without increasing the horsepower of the airboat engine, which is highly desirable.

20 Claims, 8 Drawing Sheets

AIRBOAT RUDDER

CROSS-REFERENCE TO RELATED APPLICATION

This application claims the benefit of U.S. Provisional Patent Application No. 62/873,657, filed on Jul. 12, 2019, which are both incorporated herein in their entireties.

FIELD OF THE INVENTION

This invention is directed generally to airboats, and more particularly to steering systems for airboats.

BACKGROUND

Airboats are powered by a propeller extending from an engine mounted on a motor stand in an aft part of a boat. Rudders are positioned aft of the propeller to direct propwash so that the airboat driver can control the direction of travel of the airboat. Airboats can run in water and on dry ground. Depending on engine horsepower and weight of the airboat, airboats susceptible to getting stuck on dry ground, dry mud, sawgrass, and the like. When an airboat gets stuck, the airboat driver uses all of the thrust that the engine and propeller can create to power out of being stuck. If that doesn't work, the driver can rock, or walk, the boat left and right to try to walk each side of the boat slowly forward. The driver does this by turning the rudder hard to one side. The boat will turn in a first direction causing the outboard side of the boat to advance forward some. The driver may then turn the rudder hard to opposite side. The boat will turn in a second direction causing the other side of the boat to become the outboard side and to advance forward some. The driver may do this repeatedly until the driver is able to free the boat. The more thrust an engine and propeller can generate, the less likely an airboat is to get stuck and remain stuck. This challenge can be overcome by increasing the horsepower of the engine and increasing the thrust created by the propeller. Additionally, if a boat can generate more lateral thrust, then the airboat is less likely to get stuck. Thus, a need exists for developing more lateral thrust for an airboat.

SUMMARY OF THE INVENTION

An airboat rudder that results in increased turning force on an airboat while also being easily controlled by the airboat driver is disclosed. Airboats can be configured to run on both water and dry ground. Many times somewhat dry mud and some types of grass are very difficult to run in and will cause an airboat to get stuck. One way of getting an airboat free is to walk the back end of the airboat out of the stuck condition by oscillating the one or more airboat rudders from a hard right hand turn to a hard left hand turn. Doing so creates a lateral forces on the airboat from both side directions at different times causing the back end of the airboat to move to the side and slightly forward with each side force. The airboat rudder disclosed herein increases the amount of lateral force generated on the airboat without increasing the horsepower of the airboat engine, which is highly desirable.

The airboat rudder may include an airfoil body having a leading edge, a trailing edge, a top end and a bottom end. The airfoil body may be configured to be pivotably attached to an airboat such that the airfoil body may be rotated relative to the airboat to deflect propwash from a rotating propeller on the airboat. The airboat rudder may include a top end cap attached to a top end of the airfoil body and a bottom end cap attached to a bottom end of the airfoil body. A ratio of airfoil width at a widest point of the airfoil body relative to airfoil length from the leading edge to the trailing edge may be between ¼ and ½. A ratio of a length of the top end cap extending from an outer surface of the airfoil relative to airfoil width may be between ⅛ and ½. The widest point of the airfoil may be located by a ratio of a distance measured from the leading edge towards a trailing edge relative to a total distance from the leading edge to the trailing edge of between ⅕ and ⅔.

In at least one embodiment, the ratio of airfoil width at the widest point of the airfoil body relative to airfoil length from the leading edge to the trailing edge is between 11/40 and 5/11. In another embodiment, the ratio of airfoil width at the widest point of the airfoil body relative to airfoil length from the leading edge to the trailing edge is between 3/10 and 7/20.

In at least one embodiment, the ratio of the length of the top end cap extending from the outer surface of the airfoil relative to airfoil width is between ⅙ and ⅓. In another embodiment, the ratio of the length of the top end cap extending from the outer surface of the airfoil relative to airfoil width is between ⅕ and 3/10.

In at least one embodiment, the widest point of the airfoil is located by a ratio of a distance measured from the leading edge towards a trailing edge relative to a total distance from the leading edge to the trailing edge of between 3/10 and ½. In another embodiment, the widest point of the airfoil is located by a ratio of a distance measured from the leading edge towards a trailing edge relative to a total distance from the leading edge to the trailing edge of between 7/20 and 9/20.

The airfoil rudder may be configured such that the top end cap extends a uniform distance radially outward from the outer surface of the airfoil. In another embodiment, the top end cap may extend a different distance radially outward from the outer surface of the airfoil at different places along the airfoil from the leading edge to the trailing edge. The top end cap may extend a distance radially outward between the leading edge and the widest point of the airfoil less than a distance radially outward between the widest point of the airfoil and the trailing edge. The top end cap may extend a distance between ten percent and twenty five percent greater from the airfoil outer surface between the widest point of the airfoil and the trailing edge than between the leading edge and the widest point of the airfoil.

The bottom end cap may extend a uniform distance radially outward from the outer surface of the airfoil. In another embodiment, the bottom end cap may extend a different distance radially outward from the outer surface of the airfoil at different places along the airfoil from the leading edge to the trailing edge. The bottom end cap may extend a distance radially outward between the leading edge and the widest point of the airfoil less than a distance radially outward between the widest point of the airfoil and the trailing edge. The bottom end cap may extend a distance between ten percent and twenty five percent greater from the airfoil outer surface between the widest point of the airfoil and the trailing edge than between the leading edge and the widest point of the airfoil.

An advantage of the airboat rudder is that the airboat rudder is configured to provide increased laterally thrust to the airboat when the airboat rudder is turned hard to port or starboard which makes it much easier for the airboat to move when stuck in sawgrass, mud or other spot.

Another advantage of the airboat rudder is that the airboat rudder is configured to provide increased laterally thrust to the airboat when the airboat rudder is turned hard to port or starboard without increasing the horsepower of the airboat engine.

Yet another advantage of the airboat rudder is that while the airboat rudder provides increased laterally thrust to the airboat when the airboat rudder is turned hard to port or starboard, the airboat rudder is not difficult via a steering arm by an airboat driver, thereby overcoming shortcomings of conventional airboat rudders.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
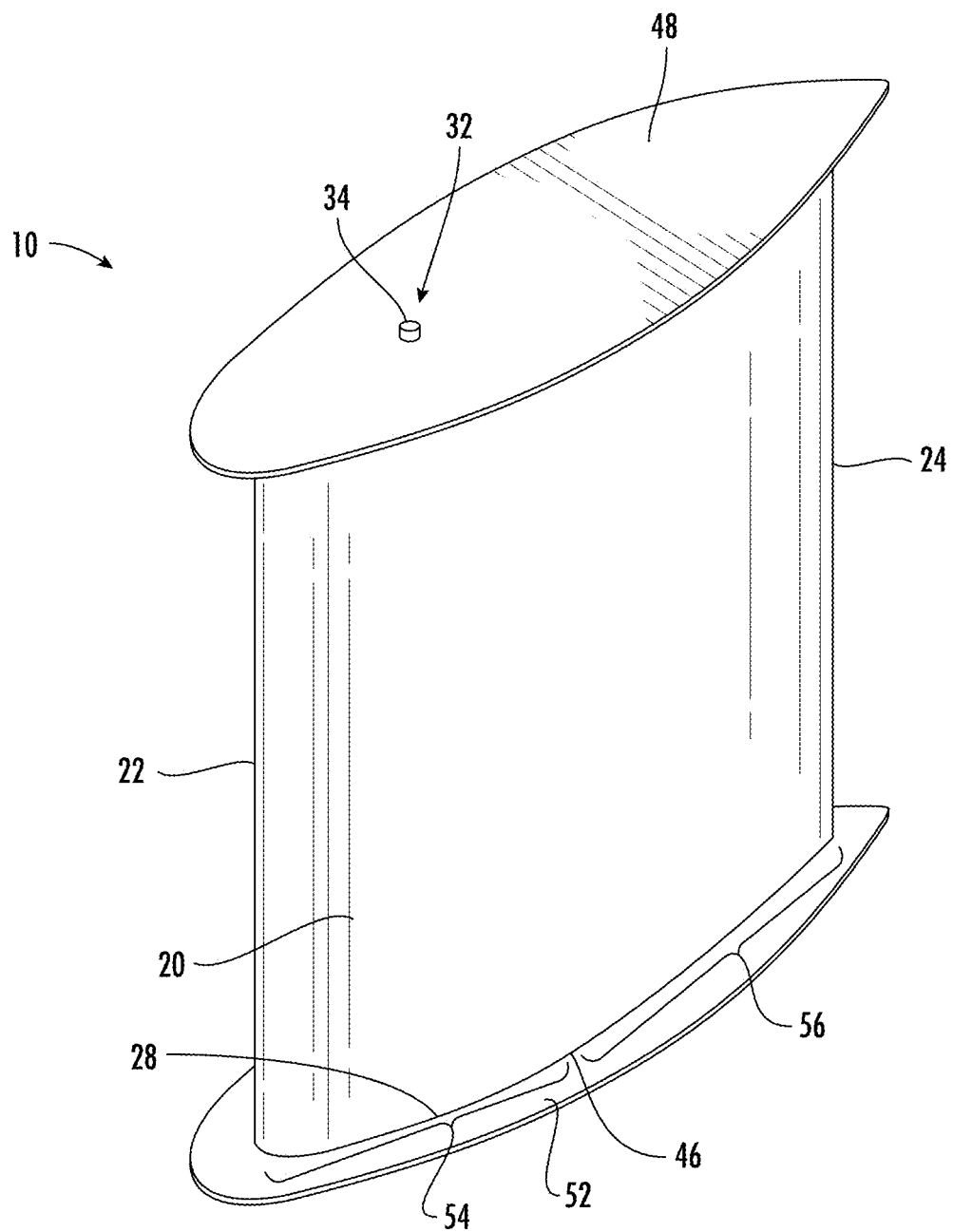
FIG. 1 is a perspective view of an airboat rudder with top and bottom end caps.

As shown in FIGS. 1-8, an airboat rudder 10 that results in increased turning force on an airboat 12 while also being easily controlled by the airboat driver is disclosed. Airboats 12 can be configured to run on both water and dry ground. Many times somewhat dry mud and some types of grass are very difficult to run in and will cause an airboat 12 to get stuck. One way of getting an airboat 12 free is to walk the back end 14 of the airboat 12 out of the stuck condition by oscillating the one or more airboat rudders 10 from a hard right hand turn to a hard left hand turn. Doing so creates a lateral forces on the airboat 12 from both side directions at different times causing the back end 14 of the airboat 12 to move to the side and slightly forward with each side force. The airboat rudder 10 disclosed herein increases the amount of lateral force generated on the airboat 12 without increasing the horsepower of the airboat engine 16, which is highly desirable.

Figure 2:
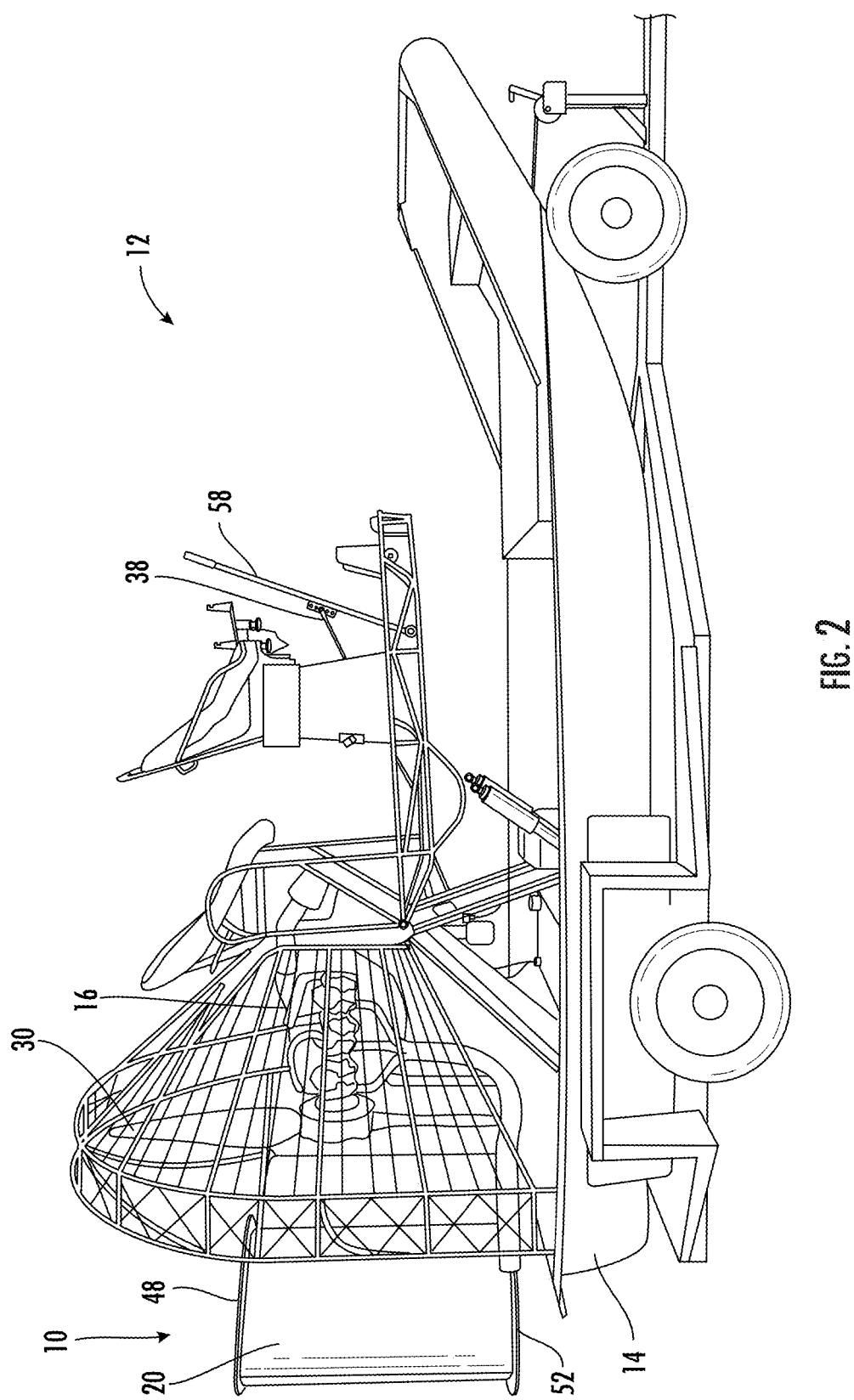
FIG. 2 is a side view of an airboat with two airboat rudders of FIG. 1 installed thereon.
Figure 3:
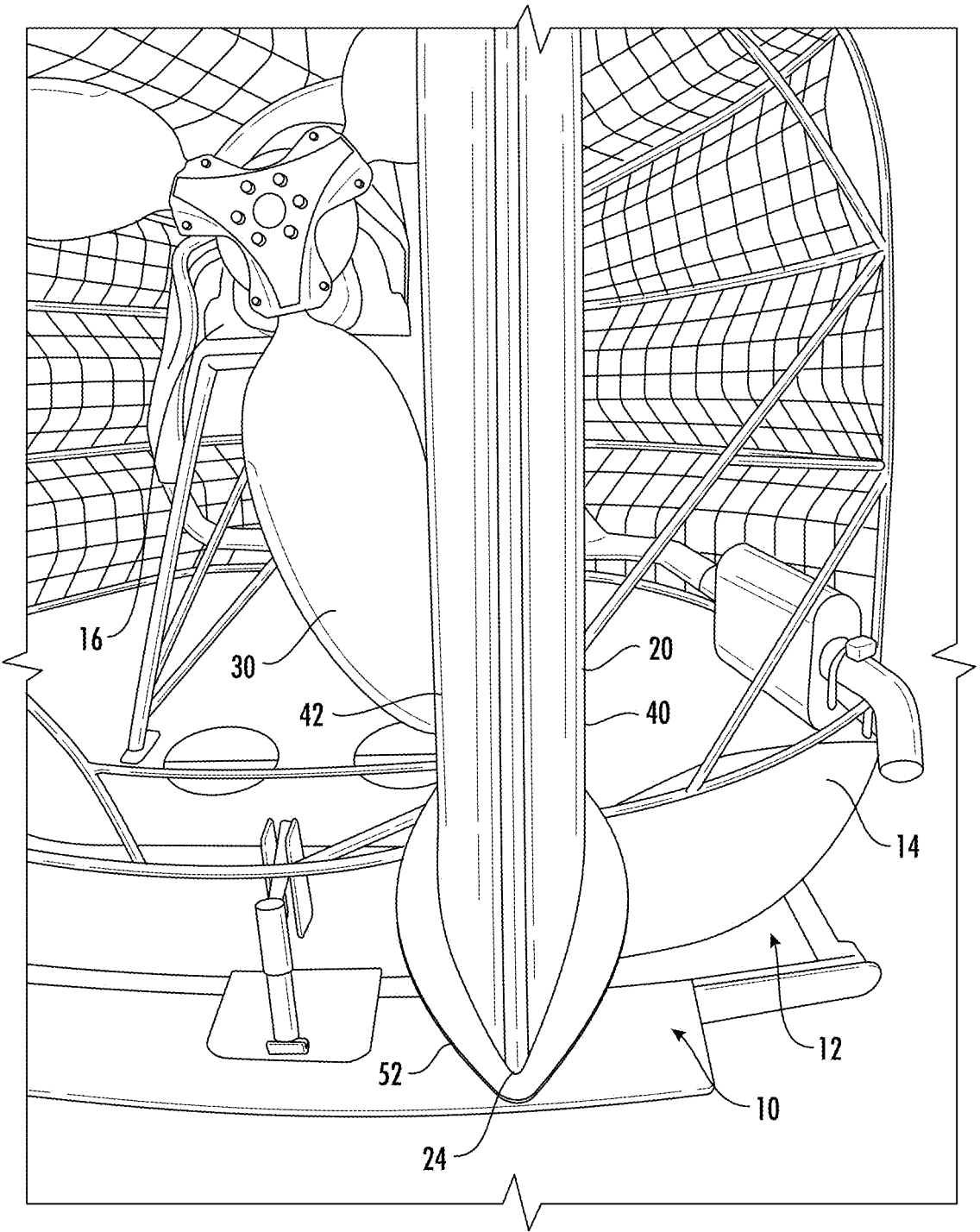
FIG. 3 is a perspective rear view of the airboat rudder attached to an airboat and aligned with a longitudinal axis of the airboat.
Figure 4:
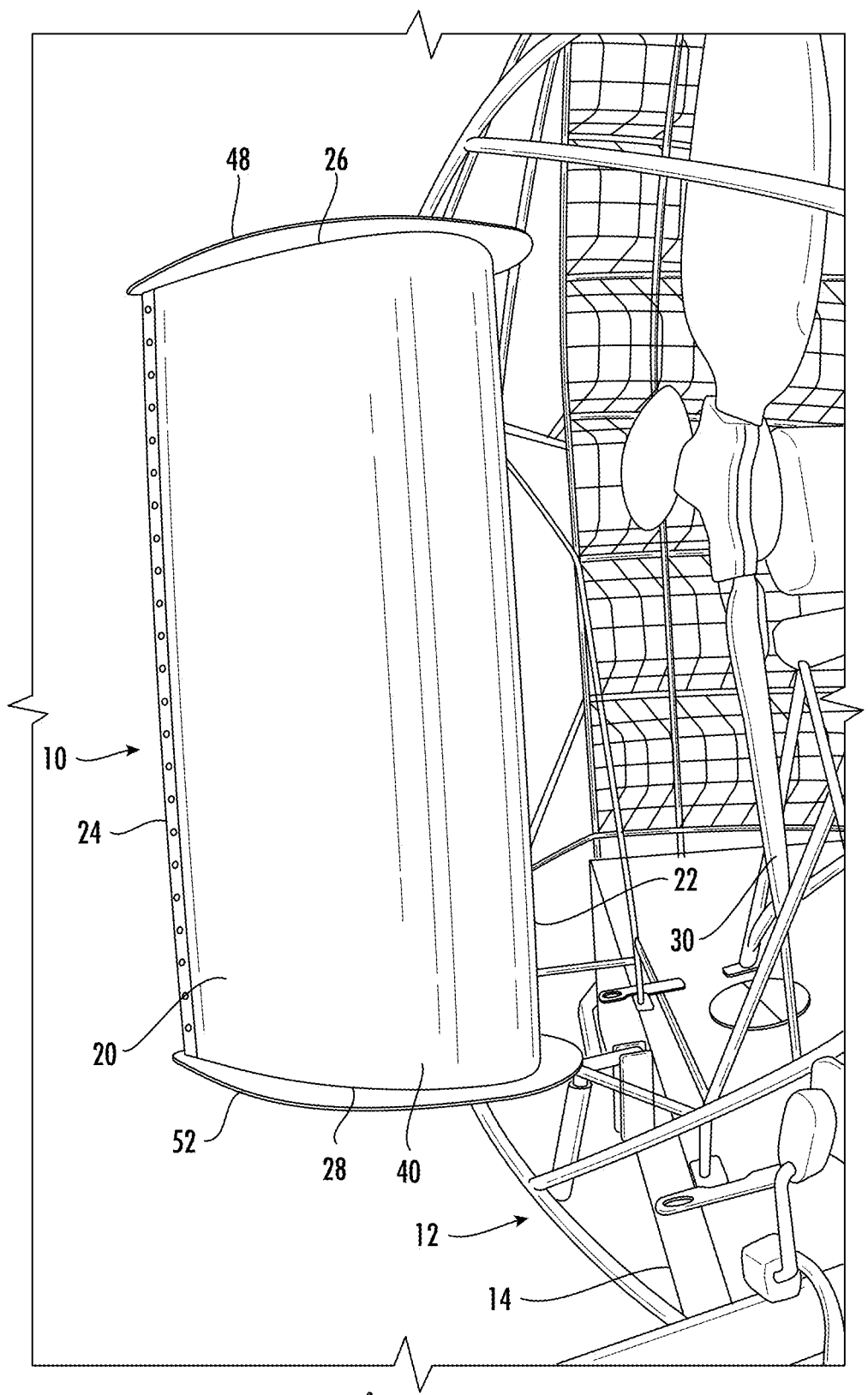
FIG. 4 is a side view of the airboat rudder of FIG. 3.
Figure 5:
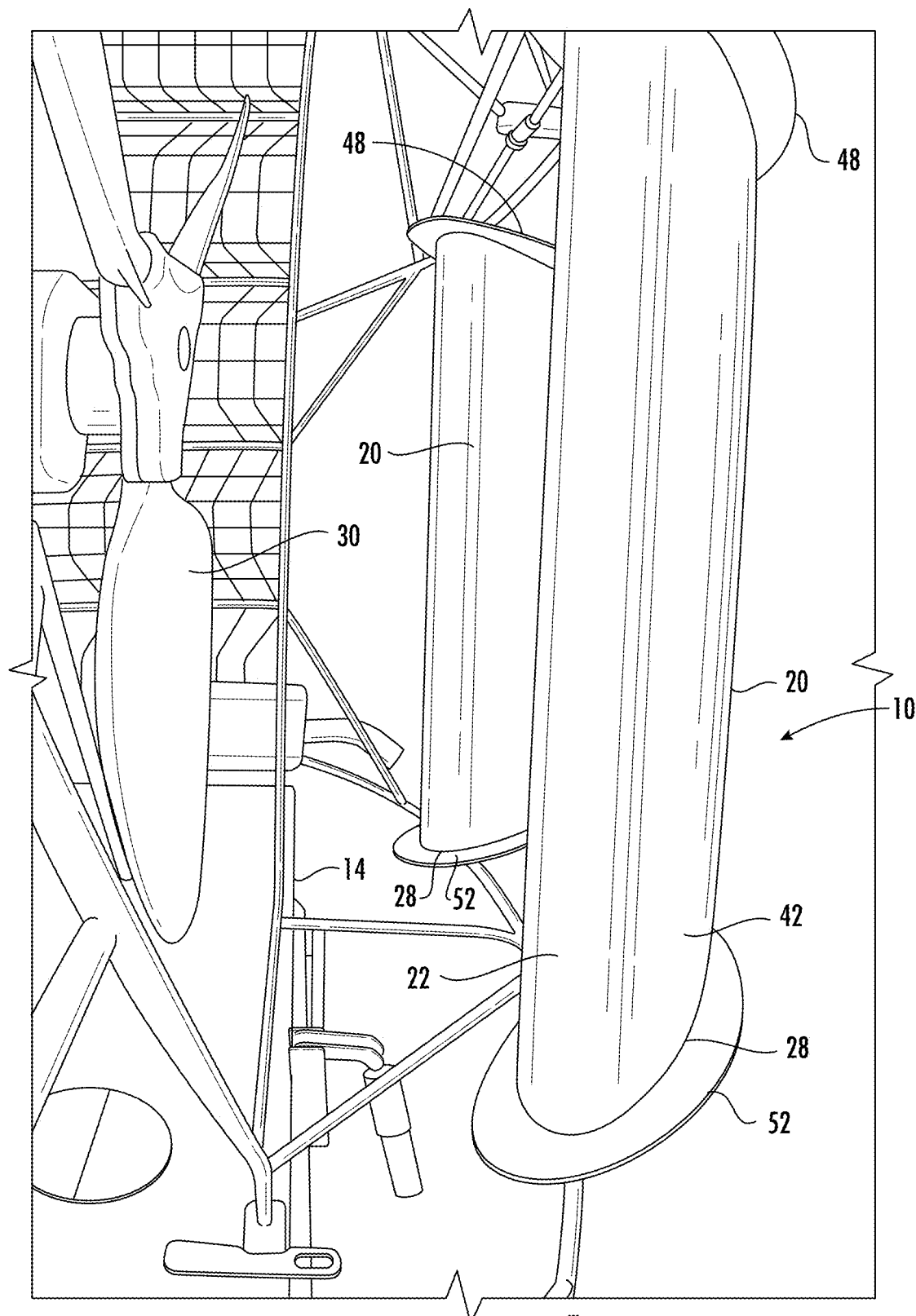
FIG. 5 is a partial side view of an aft end of the airboat and leading edge of the airboat rudders with the airboat rudders turned hard to port.
Figure 6:
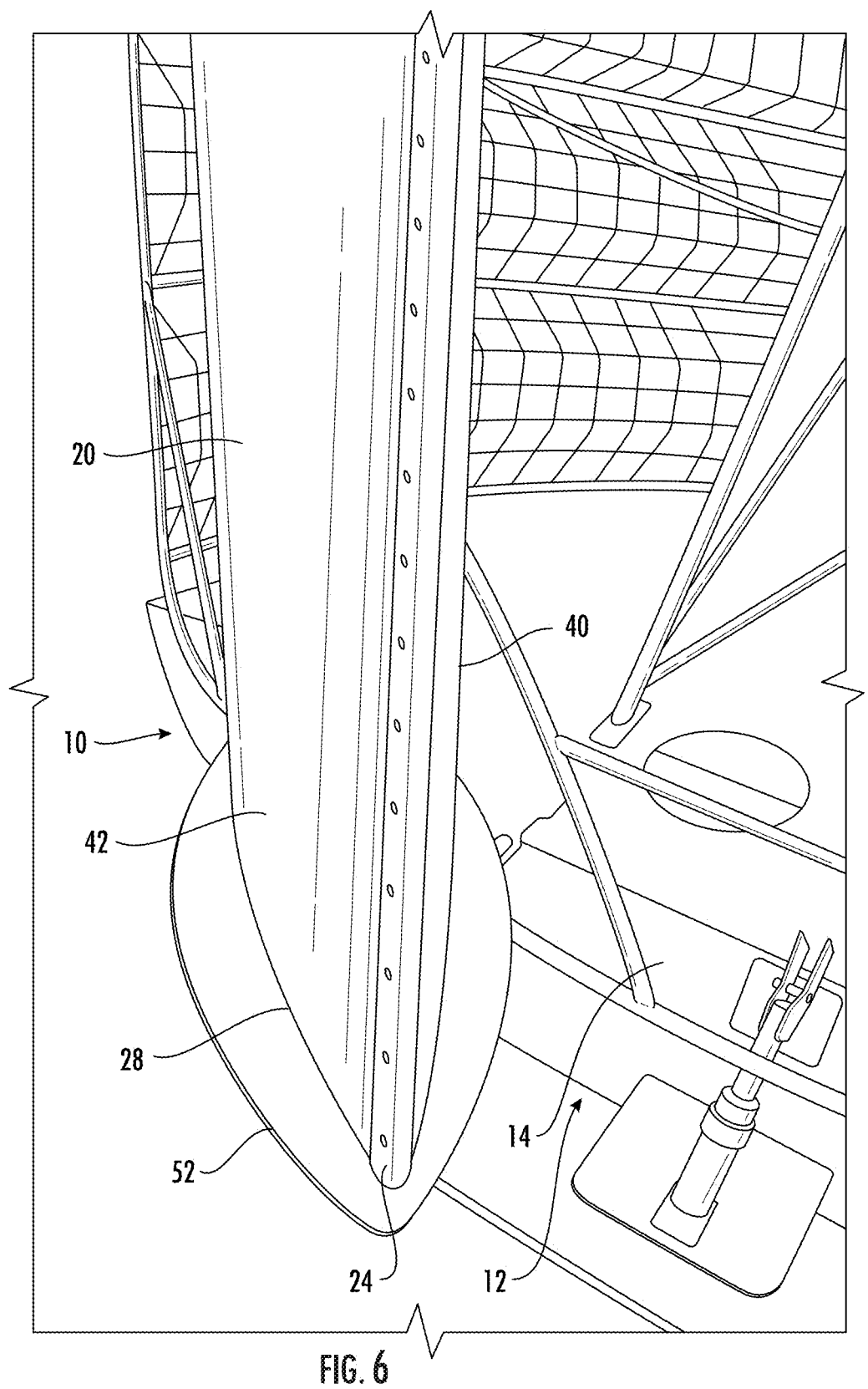
FIG. 6 is a partial rear view of the aft end of the airboat and trailing edge of the airboat rudders of FIG. 5 with the airboat rudders turned hard to port.
Figure 7:
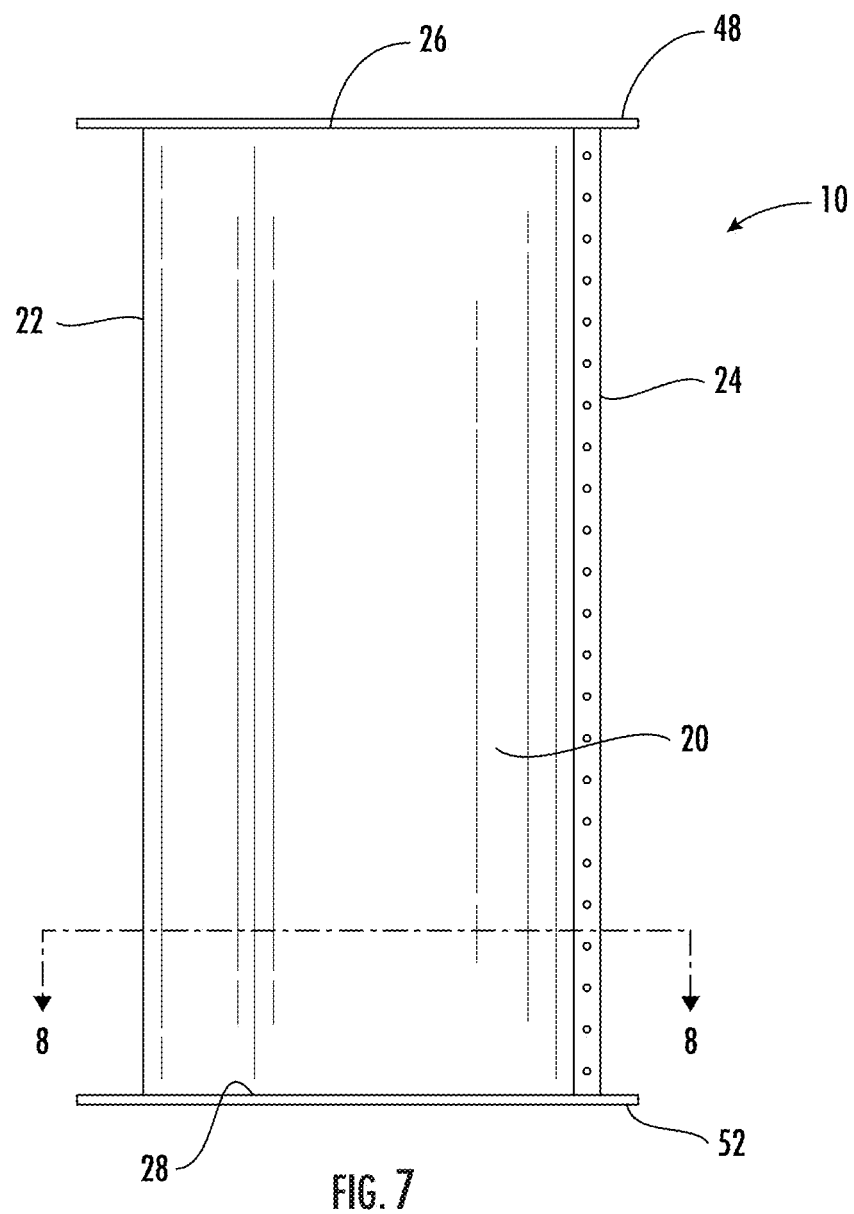
FIG. 7 is a side view of the airboat rudder.
Figure 8:
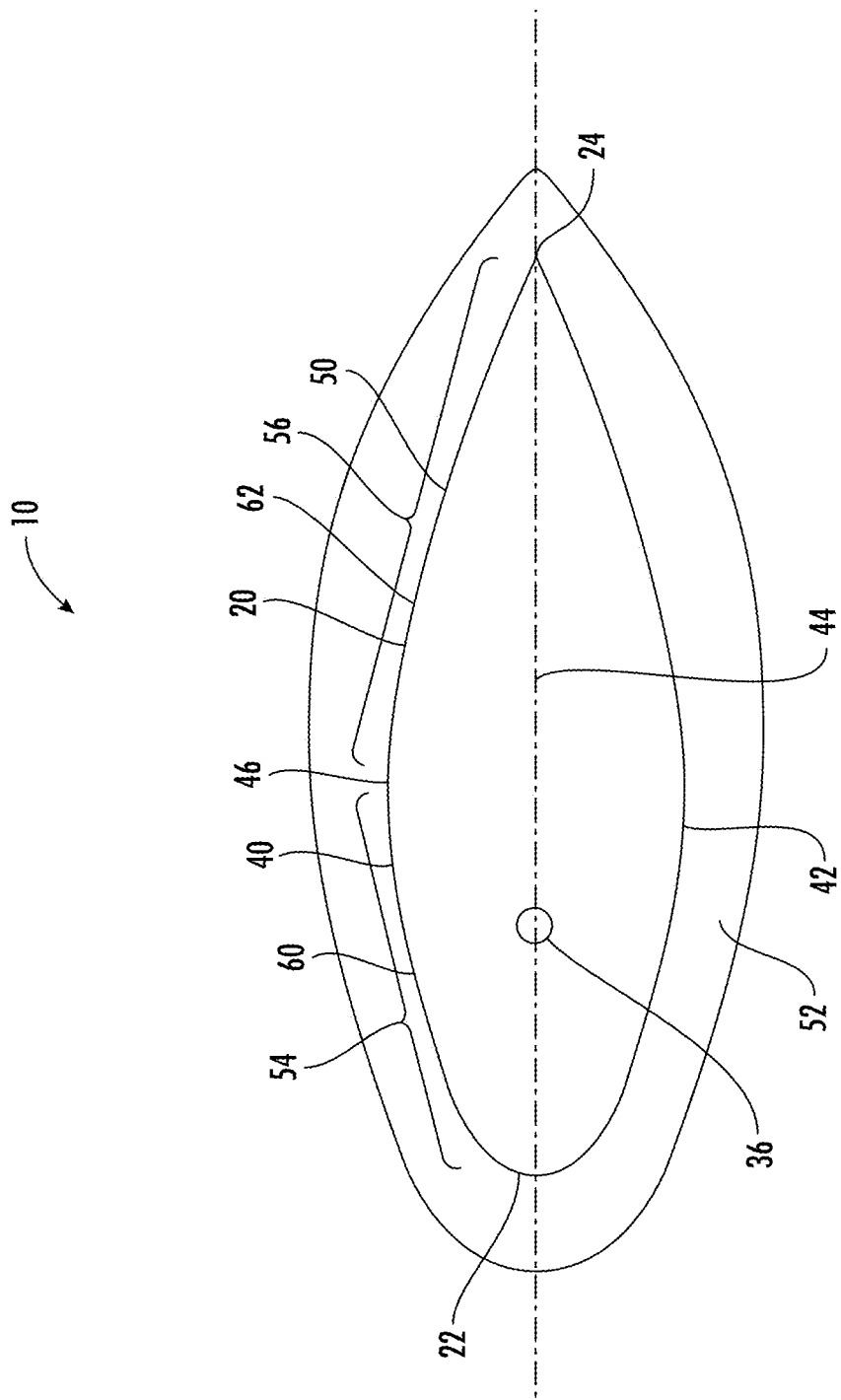
FIG. 8 is a cross-sectional top view of the airboat rudder taken along section line 8-8 in FIG. 7.

As shown in FIGS. 1, 7 and 8, the airboat rudder 10 may be form an airfoil body 20 having a leading edge 22, a trailing edge 24, a top end 26 and a bottom end 28. The leading edge 22 of the airfoil body 20 may be an edge extending from the top end 26 to the bottom end 28. The trailing edge 24 of the airfoil body 20 may be an edge extending from the top end 26 to the bottom end 28. The airfoil body 20 may be configured to be pivotably attached to an airboat 12 such that the airfoil body 20 may be rotated relative to the airboat 12 to deflect propwash from a rotating propeller 30 on the airboat 12. The airboat rudder 10 may be supported pivotably and positioned aft of one or more propellers 30 attached to the airboat engine 16. The airboat rudder 10 may be supported in any appropriate manner. The airboat rudder 10 may be controlled via one or more steering cables 38, as shown in FIG. 2, coupled to the airfoil body 20, which may be the top end 26 or the bottom end 28. In at least one embodiment, the airboat rudder 10 may be supported via at least one pivot point 32. The steering cable 38 may be pivotably coupled to the top end 26 or the bottom end 28 offset from the pivot point 32 along an axis extending between the leading edge 22 and the trailing edge 24.

In one or more embodiments, the pivot point 32 may include a top pivot point 34 and a bottom pivot point 36. The top pivot point 34 may be positioned on the top end 26 of the airfoil body 20. The top pivot point 34 may be aligned with an axis extending between the leading edge 22 and the trailing edge 24. The top pivot point 34 may be positioned between the leading edge 22 and one half of a distance from the leading edge 22 to the trailing edge 24. In another embodiment, the top pivot point 34 may be positioned a ratio of a distance from the leading edge 22 to the top pivot point 34 relative to a distance from the leading edge 22 to the trailing edge 24 of between and including about $3/20$ and about $7/20$. In another embodiment, the top pivot point 34 may be positioned a ratio of a distance from the leading edge 22 to the top pivot point 34 relative to a distance from the leading edge 22 to the trailing edge 24 of between and including about $1/5$ and about $3/10$.

The bottom pivot point 36 may be positioned on the bottom end 28 of the airfoil body 20. The bottom pivot point 36 may be aligned with an axis extending between the leading edge 22 and the trailing edge 24. The bottom pivot point 36 may be positioned between the leading edge 22 and one half of a distance from the leading edge 22 to the trailing edge 24. In another embodiment, the bottom pivot point 36 may be positioned a ratio of a distance from the leading edge 22 to the bottom pivot point 36 relative to a distance from the leading edge 22 to the trailing edge 24 of between and including about $3/20$ and about $7/20$. In another embodiment, the bottom pivot point 36 may be positioned a ratio of a distance from the leading edge 22 to the bottom pivot point 36 relative to a distance from the leading edge 22 to the trailing edge 24 of between and including about $1/5$ and about $3/10$.

The airfoil body 20 of the airboat rudder 10 may have a generally aerodynamic shape of an airfoil. The airboat rudder 10 generally has first and second sides 40, 42 extending from the leading edge 22. The first and second sides 40, 42 may be similar. In at least one embodiment, the first and second sides 40, 42 may be identical. The leading edge 22 may be a generally curved edge that transitions smoothly from the first side to the second side 40, 42. Extending towards the trailing edge 24, the airfoil body 20 on both the first and second sides 40, 42 extends away from the axis 44 extending from the leading edge 22 to the trailing edge 24 until reaching a widest point 46, as shown in FIG. 8. From the widest point 46, the airfoil body 20 on both the first and second sides 40, 42 extends towards the axis 44 extending from the leading edge 22 to the trailing edge 24 until reaching the trailing edge 24. In at least one embodiment, the airfoil body 20 may be formed from a single piece of material forming a hollow airfoil body 20. The material may be bent to form the leading edge 22 of the airfoil body 20. The first and second sides 40, 42 may be coupled together at the trailing edge 24 via a weld, fasteners, such as, but not limited to, rivets, and the like. The airfoil body 20 may be formed from materials that are lightweight, such as, but not limited to, aluminum. The material forming the airfoil body 20 may have a thickness, such as, but not limited to being between 0.030 inch and 0.080 inch. The airfoil body 20 may have any appropriate height depending on the size of the propeller 30 on the airboat 12 and the number of airboat rudders 10 attached to the airboat 12. In at least one embodiment, the airboat rudders 10 may have a height of between three feet and six feet. In at least one embodiment, the airboat rudders 10 may be between 3.5 feet and 4.5 feet in height. The airboat rudders 10 may typically be mounted on an airboat 12 such that an axis extending between the top pivot point 34 and the bottom pivot point 36 is generally vertical. In at least one embodiment a ratio of airboat rudder 10 height to a distance between the leading edge 22 and the trailing edge 24 may be between 3:2 and 3:1. In another embodiment, the ratio of airboat rudder 10 height to a distance between the leading edge 22 and the trailing edge 24 may be between 7:4 and 9:4.

The airboat rudder 10 may include a top end cap 48 attached to a top end 26 of the airfoil body 20. The top end cap 48 may extend outwardly from an outer surface 50 of the airfoil body 20 in a direction generally perpendicular to the outer surface 50. The top end cap 48 may extend outwardly from the airfoil body 20 past the intersection of the airfoil body at the leading and trailing edges 22, 24 and the first and second sides 40, 42. The top end cap 48 may be formed from lightweight materials such as, but not limited to, aluminum. The top end cap 48 may be attached via a weld, connector, such as, but not limited to, rivets, and other appropriate connection systems already known or yet to be invented. The top end cap 48 may be configured such that a ratio of a length of the top end cap 48 extending from an outer surface 50 of the airfoil body 20 relative to airfoil width at the widest point 46 is between ⅛ and ½. In another embodiment, the ratio of the length of the top end cap 48 extending from the outer surface 50 of the airfoil body 20 relative to airfoil width at the widest point 46 is between ⅙ and ½. In yet another embodiment, the ratio of the length of the top end cap 48 extending from the outer surface 50 of the airfoil body 20 relative to airfoil width at the widest point 46 is between ⅙ and ⅓. In another embodiment, the ratio of the length of the top end cap 48 extending from the outer surface 50 of the airfoil body 20 relative to airfoil width at the widest point 46 is between ⅕ and ³⁄₁₀.

In at least one embodiment, the top end cap 48 may extend a uniform distance radially outward from the outer surface 50 of the airfoil body 20. The top end cap 48 may also extend a different distance radially outward from the outer surface 50 of the airfoil body 20 at different places along the airfoil body 20 from the leading edge 22 to the trailing edge 24. For example and not by means of limitation, the top end cap 48 may extend a distance radially outward between the leading edge 22 and the widest point 46 of the airfoil body 20 less than a distance radially outward between the widest point 46 of the airfoil body 20 and the trailing edge 24. The top end cap 48 may extend a distance between ten percent and twenty five percent greater from the airfoil outer surface 50 between the widest point 46 of the airfoil body 20 and the trailing edge 24 than between the leading edge 22 and the widest point 46 of the airfoil body 20. In at least one embodiment, the top end cap 48 may have any appropriate thickness sufficient to withstand the forces of the propwash and in at least one embodiment, may be between 0.030 inch and 0.120 inch in thickness.

The airboat rudder 10 may include a bottom end cap 52 attached to a bottom end 28 of the airfoil body 20. The bottom end cap 52 may extend outwardly from an outer surface 52 of the airfoil body 20 in a direction generally perpendicular to the outer surface 52. The bottom end cap 52 may extend outwardly from the airfoil body 20 past the intersection of the airfoil body at the leading and trailing edges 22, 24 and the first and second sides 40, 42. The bottom end cap 52 may be formed from lightweight materials such as, but not limited to, aluminum. The bottom end cap 48 may be attached via a weld, connector, such as, but not limited to, rivets, and other appropriate connection systems already known or yet to be invented. The bottom end cap 52 may be configured such that a ratio of a length of the bottom end cap 52 extending from an outer surface 50 of the airfoil body 20 relative to airfoil width at the widest point 46 is between ⅛ and ½. In another embodiment, the ratio of the length of the bottom end cap 52 extending from the outer surface 50 of the airfoil body 20 relative to airfoil width at the widest point 46 is between ⅙ and ½. In yet another embodiment, the ratio of the length of the bottom end cap 52 extending from the outer surface 50 of the airfoil body 20 relative to airfoil width at the widest point 46 is between ⅙ and ⅓. In another embodiment, the ratio of the length of the bottom end cap 52 extending from the outer surface 50 of the airfoil body 20 relative to airfoil width at the widest point 46 is between ⅕ and ³⁄₁₀.

In at least one embodiment, the bottom end cap 52 may extend a uniform distance radially outward from the outer surface 50 of the airfoil body 20. The bottom end cap 52 may also extend a different distance radially outward from the outer surface 50 of the airfoil body 20 at different places along the airfoil body 20 from the leading edge 22 to the trailing edge 24. For example and not by means of limitation, the bottom end cap 52 may extend a distance radially outward between the leading edge 22 and the widest point 46 of the airfoil body 20 less than a distance radially outward between the widest point 46 of the airfoil body 20 and the trailing edge 24. The bottom end cap 52 may extend a distance between ten percent and twenty five percent greater from the airfoil outer surface 50 between the widest point 46 of the airfoil body 20 and the trailing edge 24 than between the leading edge 22 and the widest point 46 of the airfoil body 20. In at least one embodiment, the bottom end cap 52 may have any appropriate thickness sufficient to withstand the forces of the propwash and in at least one embodiment, may be between 0.030 inch and 0.120 inch in thickness.

The airfoil body 20 may be configured to generate significant forces upon the airboat rudder 10 when the airboat rudder 10 is rotated in a nonaligned position relative to a longitudinal axis of the airboat 12 and propwash from the one or more propellers 30 strikes the leading growing section 54 of the airfoil body 20 and to some extent striking the trailing shrinking section 56. The leading growing section 54 of the airfoil body 20 is that part of the airfoil body 20 between the leading edge 22 and the widest part 46. The leading growing section 54 is where the airfoil body 20 is increasing in width moving from the leading edge 22 to the widest part 46. The outer surface 50 within the leading growing section 54 is curved, such as convex. The trailing shrinking section 56 of the airfoil body 20 is that part of the airfoil body 20 between the widest part 46 and the trailing edge 24. The trailing shrinking section 56 is where the airfoil body 20 is decreasing in width moving from the widest part 46 to the trailing edge 24. The outer surface 50 within the trailing shrinking section 56 is curved, such as convex.

When the airboat rudder 10 is turned hard to the port or starboard, the propwash strikes the leading growing section 54 of the airfoil body 20 and the top and bottom end caps 48, 52 creating a high lateral force vector on the airboat rudder 10, which is transferred to the airboat itself 12. The propwash also strikes the trailing shrinking section 56 generating a lateral force as well, but the lateral force generated on the trailing shrinking section 56 is not so large that rotating the airboat rudder 10 about the pivot point 32 is unmanageable as in conventional configurations. The trailing shrinking section 56 extends the largest distance from the pivot point 32 and thus, propwash could potentially create very large forces on the trailing shrinking section 56 near the trailing edge 24 which would make it very difficult for an airboat driver to steer. Instead, the force imparted on the airboat rudder 10 is tremendously larger than convention airboat rudders while enabling easy steering of the rudder 10, which may be, but is not limited to, via a steering arm 58 coupled to a steering cable 38. This larger force imparted on the airfoil rudder 10 generates more force perpendicular to a longitudinal axis of the airboat 12, thereby pushing the aft end of the airboat 12 to one side and to the other when the airboat rudder 10 is rotated to the stopping point in the other direction. Increasing the force perpendicular to a longitudinal axis of the airboat 12 enables an airboat 12 to get unstuck by turning the airboat 12 about 20 degrees to 45 degrees. Such movement advances the outer side of the airboat 12 away from a center point of the turn. The airboat driver may then rotate the rudders quickly in the opposite direction to cause the other side of the airboat 12 to become the outer side that advances. Doing this repeatedly causes the airboat 12 to become unstuck by enabling the airboat 12 to advance the port and starboard sides of the airboat 12 about three to twelve inches per rudder 10 turn. Such action is also referred to as walking the airboat 12.

The airboat rudder 10 may also be configured such that a ratio of airfoil width at the widest point 46 of the airfoil body 20 relative to airfoil length from the leading edge 22 to the trailing edge 24 is between ¼ and ½. In another embodiment, the ratio of airfoil width at the widest point 46 of the airfoil body 20 relative to airfoil length from the leading edge 22 to the trailing edge 24 is between 11/40 and 5/11. In yet another embodiment, the ratio of airfoil width at the widest point 46 of the airfoil body 20 relative to airfoil length from the leading edge 22 to the trailing edge 24 is between 3/10 and 7/20.

The airboat rudder 10 may also be configured such that the widest point 46 of the airfoil body 20 is located by a ratio of a distance measured from the leading edge 22 towards a trailing edge 24 relative to a total distance from the leading edge 22 to the trailing edge 24 of between ⅕ and ⅔. In another embodiment, the widest point 46 of the airfoil body 20 is located by a ratio of a distance measured from the leading edge 22 towards a trailing edge 24 relative to a total distance from the leading edge 22 to the trailing edge 24 of between 3/10 and ½. In yet another embodiment, the widest point 46 of the airfoil body 20 is located by a ratio of a distance measured from the leading edge 22 towards a trailing edge 24 relative to a total distance from the leading edge to the trailing edge of between 7/20 and 9/20.

As shown in FIG. 8, the airfoil body 20 includes a widest point 46. The airfoil body 20 may be configured such that a width of the airfoil body 20 taken at a first leading point 60 is between 15 percent and 25 percent less than a width of the airfoil body 20 at the widest point 46. In another embodiment, the width of the airfoil body 20 taken at a first leading point 60 is between 17 percent and 23 percent less than a width of the airfoil body 20 at the widest point 46. The first leading point 60 may be between ⅓ and ⅔ of a distance between the leading edge 22 and the widest point 46, measured from the widest point 46. In another embodiment, the first leading point 60 may be between 9/20 and 11/20 of a distance between the leading edge 22 and the widest point 46, measured from the widest point 46.

As shown in FIG. 8, the airfoil body 20 may be configured such that a width of the airfoil body 20 taken at a first trailing point 62 is between 15 percent and 25 percent less than a width of the airfoil body 20 at the widest point 46. In another embodiment, the width of the airfoil body 20 taken at a first trailing point 62 is between 17 percent and 23 percent less than a width of the airfoil body 20 at the widest point 46. The first trailing point 62 may be between 3/10 and ½ of a distance between the leading edge 24 and the widest point 46, measured from the widest point 46 toward the trailing edge 24. In another embodiment, the first trailing point 62 may be between 7/20 and 9/20 of a distance between the trailing edge 24 and the widest point 46, measured from the widest point 46 toward the trailing edge 24.

During use, the prop wash from the airboat propeller 30 passes the rudder 10. The rudder 10 may be controlled by the boat driver with a steering arm or steering wheel. Conventional rudder systems often are difficult to control when the boat is stuck in tall sawgrass and other vegetation. To get the boat unstuck, the rudders 10 are typically turned all the way in one direction or the other and often times moved back and forth. With large airboat engines creating large prop washes, moving the rudders has been difficult and with some large boats, almost impossible. In contrast, the rudders 10 disclosed herein perform very well in all conditions. The rudders 10 are easy to turn into very heavy prop wash with very little effort by the airboat driver using the rudder steering arm 58. Yet, the rudders 10 provide a sharp increase in turning power not encountered by conventional rudders. Thus, the rudders 10 feel like additional horsepower has been added to the airboat 12 or the equivalent of adding power steering to a vehicle.

The foregoing is provided for purposes of illustrating, explaining, and describing embodiments of this invention. Modifications and adaptations to these embodiments will be apparent to those skilled in the art and may be made without departing from the scope or spirit of this invention.

I claim:

1. An airboat rudder, comprising:
    an airfoil body having a leading edge, a trailing edge, a top end and a bottom end;
    wherein the airfoil body is configured to be pivotably attached to an airboat such that the airfoil body may be rotated relative to the airboat to deflect propwash from a rotating propeller on the airboat;
    a top end cap attached to a top end of the airfoil body and a bottom end cap is attached to a bottom end of the airfoil body;
    wherein a ratio of airfoil width at a widest point of the airfoil body relative to airfoil length from the leading edge to the trailing edge is between ¼ and ½;
    wherein a ratio of a length of the top end cap extending from an outer surface of the airfoil relative to airfoil width is between ⅛ and ½; and
    wherein the widest point of the airfoil is located by a ratio of a distance measured from the leading edge towards a trailing edge relative to a total distance from the leading edge to the trailing edge of between ⅕ and ⅔.

2. The airfoil rudder of claim 1, wherein the ratio of airfoil width at the widest point of the airfoil body relative to airfoil length from the leading edge to the trailing edge is between 11/40 and 5/11.

3. The airboat rudder of claim 2, wherein the ratio of airfoil width at the widest point of the airfoil body relative to airfoil length from the leading edge to the trailing edge is between 3/10 and 7/20.

4. The airfoil rudder of claim 1, wherein the ratio of the length of the top end cap extending from the outer surface of the airfoil relative to airfoil width is between 1/6 and 1/3.

5. The airfoil rudder of claim 4, wherein the ratio of the length of the top end cap extending from the outer surface of the airfoil relative to airfoil width is between 1/5 and 3/10.

6. The airfoil rudder of claim 1, wherein the widest point of the airfoil is located by a ratio of a distance measured from the leading edge towards a trailing edge relative to a total distance from the leading edge to the trailing edge of between 3/10 and 1/2.

7. The airfoil rudder of claim 6, wherein the widest point of the airfoil is located by a ratio of a distance measured from the leading edge towards a trailing edge relative to a total distance from the leading edge to the trailing edge of between 7/20 and 9/20.

8. The airfoil rudder of claim 1, wherein the top end cap extends a uniform distance radially outward from the outer surface of the airfoil.

9. The airfoil rudder of claim 1, wherein the top end cap extends a different distance radially outward from the outer surface of the airfoil at different places along the airfoil from the leading edge to the trailing edge.

10. The airfoil rudder of claim 1, wherein the top end cap extends a distance radially outward between the leading edge and the widest point of the airfoil less than a distance radially outward between the widest point of the airfoil and the trailing edge.

11. The airfoil rudder of claim 1, wherein the top end cap extends a distance between ten percent and twenty five percent greater from the airfoil outer surface between the widest point of the airfoil and the trailing edge than between the leading edge and the widest point of the airfoil.

12. The airfoil rudder of claim 9, wherein the bottom end cap extends a uniform distance radially outward from the outer surface of the airfoil.

13. The airfoil rudder of claim 9, wherein the bottom end cap extends a different distance radially outward from the outer surface of the airfoil at different places along the airfoil from the leading edge to the trailing edge.

14. The airfoil rudder of claim 9, wherein the bottom end cap extends a distance radially outward between the leading edge and the widest point of the airfoil less than a distance radially outward between the widest point of the airfoil and the trailing edge.

15. The airfoil rudder of claim 9, wherein the bottom end cap extends a distance between ten percent and twenty five percent greater from the airfoil outer surface between the widest point of the airfoil and the trailing edge than between the leading edge and the widest point of the airfoil.

16. An airboat rudder, comprising:
    an airfoil body having a leading edge, a trailing edge, a top end and a bottom end;
    wherein the airfoil body is configured to be pivotably attached to an airboat such that the airfoil body may be rotated relative to the airboat to deflect propwash from a rotating propeller on the airboat;
    a top end cap attached to a top end of the airfoil body and a bottom end cap is attached to a bottom end of the airfoil body;
    wherein a ratio of airfoil width at a widest point of the airfoil body relative to airfoil length from the leading edge to the trailing edge is between 11/40 and 5/11;
    wherein a ratio of a length of the top end cap extending from an outer surface of the airfoil relative to airfoil width is between 1/6 and 1/2; and
    wherein the widest point of the airfoil is located by a ratio of a distance measured from the leading edge towards a trailing edge relative to a total distance from the leading edge to the trailing edge of between 1/5 and 2/3.

17. The airboat rudder of claim 16, wherein the ratio of airfoil width at the widest point of the airfoil body relative to airfoil length from the leading edge to the trailing edge is between 3/10 and 7/20.

18. The airfoil rudder of claim 16, wherein the ratio of the length of the top end cap extending from the outer surface of the airfoil relative to airfoil width is between 1/5 and 3/10.

19. The airfoil rudder of claim 16, wherein the top end cap extends a different distance radially outward from the outer surface of the airfoil at different places along the airfoil from the leading edge to the trailing edge.

20. An airboat rudder, comprising:
    an airfoil body having a leading edge, a trailing edge, a top end and a bottom end;
    wherein the airfoil body is configured to be pivotably attached to an airboat such that the airfoil body may be rotated relative to the airboat to deflect propwash from a rotating propeller on the airboat;
    a top end cap attached to a top end of the airfoil body and a bottom end cap is attached to a bottom end of the airfoil body;
    wherein a ratio of airfoil width at a widest point of the airfoil body relative to airfoil length from the leading edge to the trailing edge is between 1/4 and 1/2;
    wherein a ratio of a length of the top end cap extending from an outer surface of the airfoil relative to airfoil width is between 1/6 and 1/2; and
    wherein the widest point of the airfoil is located by a ratio of a distance measured from the leading edge towards a trailing edge relative to a total distance from the leading edge to the trailing edge of between 3/10 and 1/2.

* * * * *